United States Patent [19]

Yamamoto

[11] Patent Number: 5,585,454
[45] Date of Patent: Dec. 17, 1996

[54] POLY(QUINONE) AND PREPARATION AND USE OF SAME

[75] Inventor: Takakazu Yamamoto, Yokohama, Japan

[73] Assignee: Tokyo Institute of Technology, Tokyo, Japan

[21] Appl. No.: 302,177

[22] Filed: Sep. 8, 1994

[30] Foreign Application Priority Data

Mar. 14, 1994 [JP] Japan .................................. 6-042428

[51] Int. Cl.$^6$ .................................................. C08G 6/00
[52] U.S. Cl. ...................................................... 528/220
[58] Field of Search ............................................ 528/220

[56] References Cited

U.S. PATENT DOCUMENTS

| | | | |
|---|---|---|---|
| 4,049,537 | 9/1977 | Plumlee et al. | 208/10 |
| 4,895,705 | 1/1990 | Wrighton et al. | 422/68 |
| 5,030,533 | 7/1991 | Bluhm et al. | 430/59 |

Primary Examiner—Shelley A. Dodson
Attorney, Agent, or Firm—Spencer & Frank

[57] ABSTRACT

An alkyl group-substituted poly(quinone) useful as a material for an electrochromic device and an n-type semiconductor device, includes a repeating unit, has a polymerization degree (n) of not less than 20, includes a π-conjugated system, and contains, as the repeating unit, bivalent residues of dihalogenated aromatic compounds of alkyl group-substituted quinones in which the alkyl group has from 1–8 carbon atoms and the bivalent residues are obtained by removing halogen atoms at two locations. A method for producing the alkyl group-substituted poly(quinone) includes dehalogenating and polycondensing to polymerize a dihalogenated aromatic compound of an alkyl group-substituted quinone by removing halogen atoms at two locations in the presence of a zero-valent nickel compound, whereby the zero-valent nickel compound withdraws halogens from the dihalogenated aromatic compound and causes coupling between aromatic groups thereof. Alternatively, the polymerization may be accomplished by electrochemical reduction in the presence of a divalent nickel compound.

18 Claims, 1 Drawing Sheet

POLY(QUINONE) AND PREPARATION AND USE OF SAME

BACKGROUND OF THE INVENTION

1. Field of the Invention

The present invention relates to a novel alkyl group-substituted poly(quinone), a method for manufacturing the same and applications thereof. The polymer according to the present invention has bivalent residues of dihalogenated aromatic compounds of alkyl group-substituted quinones as the repeating unit, which residues having been obtained by removing halogen atoms from the dihalogenated aromatic compounds at two locations. The polymer also has a π-conjugated system extending along the principal chain, and is converted into conductive material by electrochemical doping. Furthermore, the polymer of the present invention is stable in the air and soluble to various organic solvents. The present invention also relates to materials for electrochromic devices and n-type semiconductor devices, which utilize the alkyl group-substituted poly(quinone) to show two-stepped color changes at a rather small reduction voltage.

DESCRIPTION OF THE RELATED ART

Recently, π-conjugated polymers are appreciated as materials that perform electrolytic and optical functions. In these polymers having a π-conjugated system, π electrons in the system extend in one dimension along the principal chain of the polymer. Accordingly, such polymers have electrical conductivity and high photosensitivity. Also, since these π-conjugated polymers generate, in its principle chain, positively charged carriers when oxidized, and negatively charged carriers when reduced, they can have high electrical conductivity. In this connection, the redox reactions are accompanied by color changes of the π-conjugated polymers, and therefore, these compounds can be used as materials for an electrochromic device. This redox function can further be applied to a production of a modified electrode.

As these conductive polymers having the π-conjugated system extending along the principal chain, various compounds as shown by the following chemical formulae are known. For the simplicity, they are hereinafter collectively referred to as Formula (1).

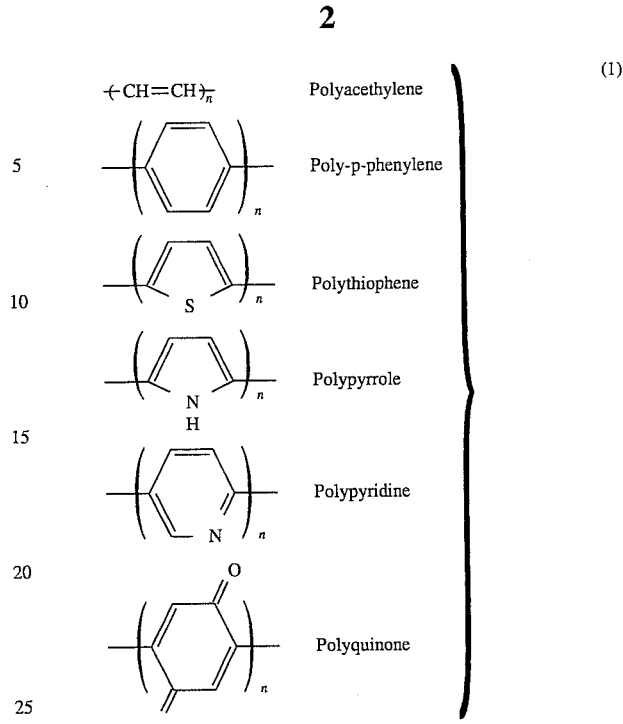

On the other hand, quinones are known as one of typical π-conjugated molecules which have a redox power. Due to the unique redox power of quinones, conductive polymers comprising quinone units as its repeating unit have excellent properties which the other π-conjugated conductive polymers cannot have. For example, poly-p-phenylene, polythiophene and polypyridine shown in the above Formula (1) require more negative potential than about −2.0V vs. Ag/Ag+ to be electrochemically reduced while exhibiting color change (electrochromism). Poly(quinone), however, requires much less negative potential such as about −1.3V vs. Ag/Ag+ to exhibit such color change caused by the electrochemical reduction. In addition, different from those of the other π-conjugated polymers, the color change of the poly(quinone) is two-stepped one, and therefore, the poly(quinone) can have a unique property as a material for a display element. Polyacethylene is not chemically stable, and also there is difficulty in confirming color changes caused by electrochemical redox reaction due to its blackish color. With respect to polypyrrole, it is difficult to electrochemically reduce this polymer.

As described above, poly(quinone)s have advantages such that they undergo electrochemical reduction reaction at a rather small negative potential of about −1.0V vs. Ag/Ag+, more specifically at −1.3V vs. Ag/Ag+, while being accompanied by a unique two-stepped color change. However, most of the known poly(quinone)s also have disadvantages such as insolubility to organic solvents, infusibility and the like. Due to these disadvantages, there has not been found any effective processing method for these conventional poly(quinone)s. Accordingly, it is difficult to mold and give a predetermined shape to the conventional poly(quinone)s, and thus, only limited applications have been found for these polymers and the unique functions thereof have not been utilized effectively.

Furthermore, although the known poly(quinone) can easily become a n-type conductor through reduction, it is difficult for them to be formed into a predetermined shape such as a film due to their insolubility to solvents. This also has greatly restricted applications of these polymers.

SUMMARY OF THE INVENTION

Considering these background arts, the inventors of the present invention have been searched for a novel conductive polymer comprising repeating quinone units, which has an improved solubility to common solvents. In this connection, the inventors have investigated to introduce an alkyl substitution group into an aromatic ring of poly(quinone) to improve the solubility of the polymer to the organic solvents.

Accordingly, it is a primary object of the present invention to provide a novel alkyl group-substituted poly(quinone) comprising repeating quinone units, which has a sufficiently large molecular weight, an excellent heat-resistivity and improved solubility to various organic solvents, and undergo a two-stepped electrochemical reduction at a rather small potential, while being accompanied by two-stepped color change.

To attain the above-mentioned object, there is provided according to the present invention, an alkyl group-substituted poly(quinone) having a polymerization degree (n) of not less than 20, and comprising, as the repeating unit, bivalent residues of dihalogenated aromatic compounds of alkyl group-substituted quinones, which bivalent residues being obtained by removing halogen atoms at two locations.

The present invention also provides a method for producing an alkyl group-substituted poly(quinone) comprising dehalogenating dihalogenated aromatic compounds of alkyl group-substituted quinones by removing halogen atoms at two locations, and polymerizing the dehalogenated aromatic compounds, in the presence of a nickel compound.

Since the poly(quinone) of the present invention has an alkyl substitution group, the polymer has an improved solubility to common organic solvents, and by utilizing an appropriate organic solution thereof, the polymer can be easily formed into a predetermined shape such as fibers, films and the like. Furthermore, since the polymer of the present invention comprises quinone units, which exhibit the above-explained unique redox behavior, as the repeating unit, the polymer can be used as a conductive material such as n-type conductor, material for batteries, material for electrochromic devices, and material for electronic devices such as transistors or diodes, by also making use of its improved solubility to various solvents.

DETAILED DESCRIPTION OF THE INVENTION

Figure 1:
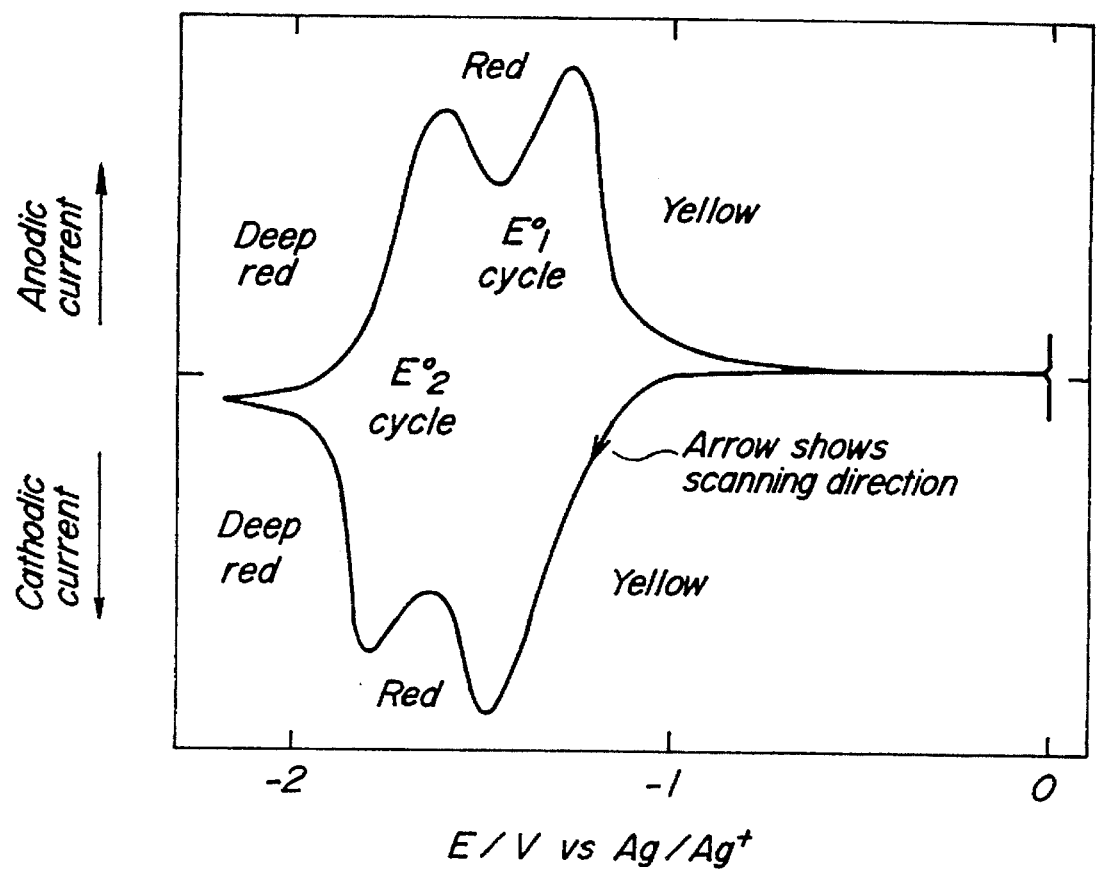
FIG. 1 is a graph showing a cyclic voltammogram of an example of the poly(quinone) according to the present invention.

The present invention will be explained in detail below.

According to the first aspect of the present invention, there is provided an alkyl group-substituted poly(quinone) having a polymerization degree (n) of not less than 20, and comprising, as the repeating unit, bivalent residues of dihalogenated aromatic compounds of alkyl group-substituted quinones, which bivalent residues being obtained by removing halogen atoms at two locations.

As examples of the alkyl group-substituted poly(quinone) according to the present invention, mention may be made to polymers having, as the repeating unit, an alkyl group-substituted benzoquinone, an alkyl group-substituted naphthoquinone, an alkyl group-substituted anthraquinone or one of their derivatives, namely to those shown by the following chemical formulae. For the simplicity, the following formulae are hereinafter collectively referred to as Formula (2).

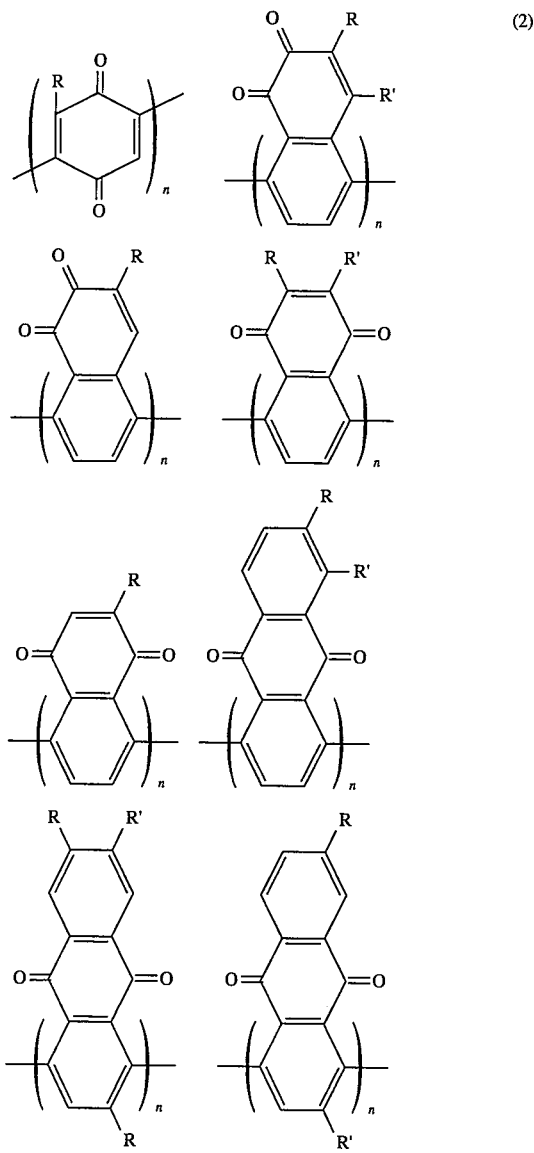

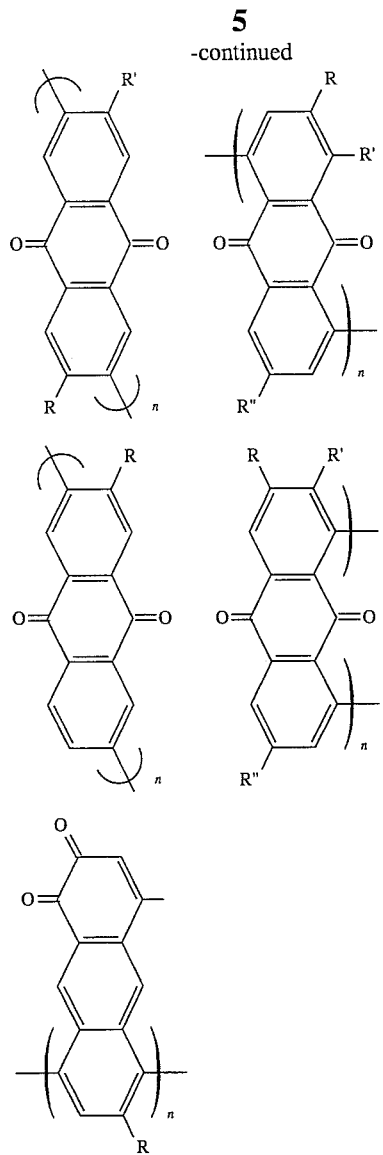
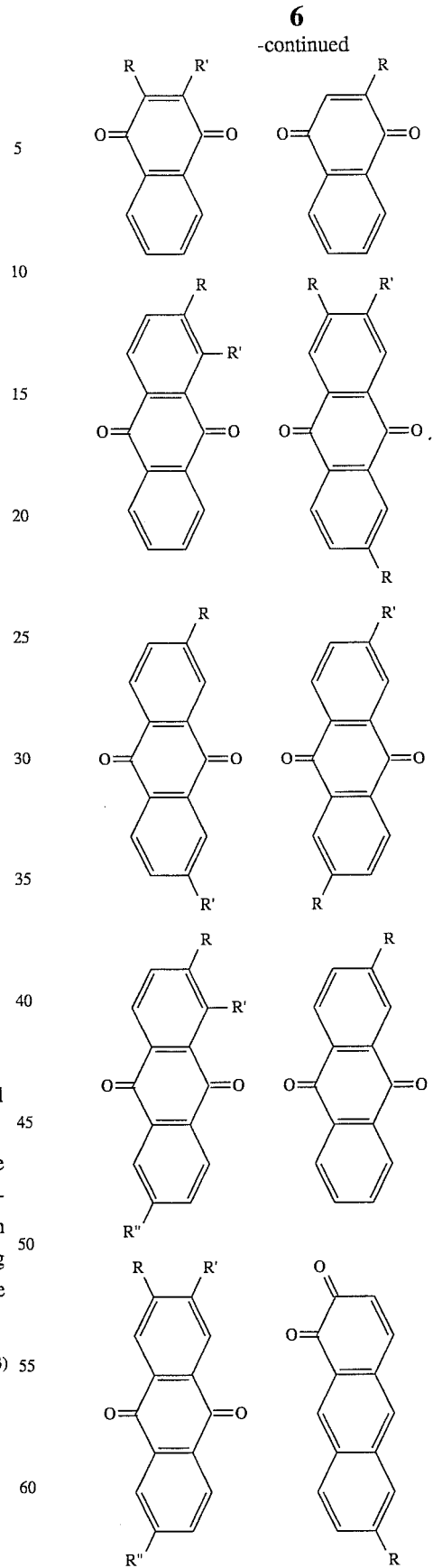

(wherein R, R' and R" respectively represent an alkyl group).

The above-described polymers can be obtained by the following process. First, a hydrogen atom of a corresponding quinone is substituted with an alkyl group to obtain each alkyl group-substituted quinone shown by the following formulae. For the simplicity, the following formulae are hereinafter collectively referred to as Formula (3).

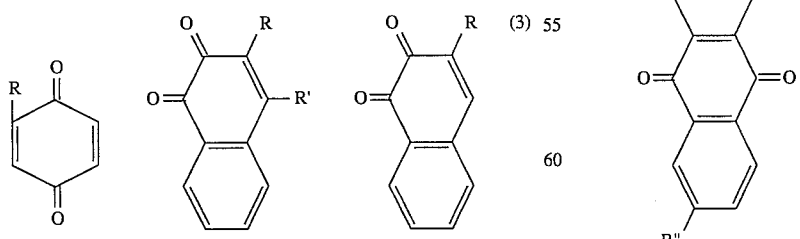

(wherein R represents an alkyl group). Next, hydrogen atoms of such alkyl group-substituted quinones are substituted with halogen atoms at two locations to attain such alkyl group-substituted dihalogenated aromatic compounds as shown by the following formulae. For the simplicity, the following formulae are hereinafter collectively referred to as Formula (4). perform functions as a conductive polymer effectively. Accordingly, the position at which one alkyl group-substituted quinone is combined to another is preferably such a place that the resulting polymer could have a π-conjugated system, which extends along the principal chain.

Also, the poly(quinone) according to the present invention may preferably have a solubility to N-methylpyrrolidone in an amount of 50 mg per 10 ml or more. The alkyl group-substituted poly(quinone) of the present invention is soluble to various solvents such as chloroform, methylene chloride, N-methylpyrrolidone, toluene, benzene, tetrahydrofuran and the like. For instance, 50 mg or more of this polymer is soluble in 10 ml of N-methylpyrrolidone. When the solubility of the polymer is less than 50 mg, moldability thereof is too poor to obtain a sufficiently strong film. The more preferred amount of solubility is 80–500 mg. When the polymer has a solubility of not less than 80 mg, viscosity of the solution used for preparing films increases significantly, thereby making the resulting films quite strong. On the other hand, a solubility of 500 mg may be the upper limit for producing industrially competitive films in the light of cost.

With respect to the alkyl substitution group (R) of the quinones used as the monomer for preparing the

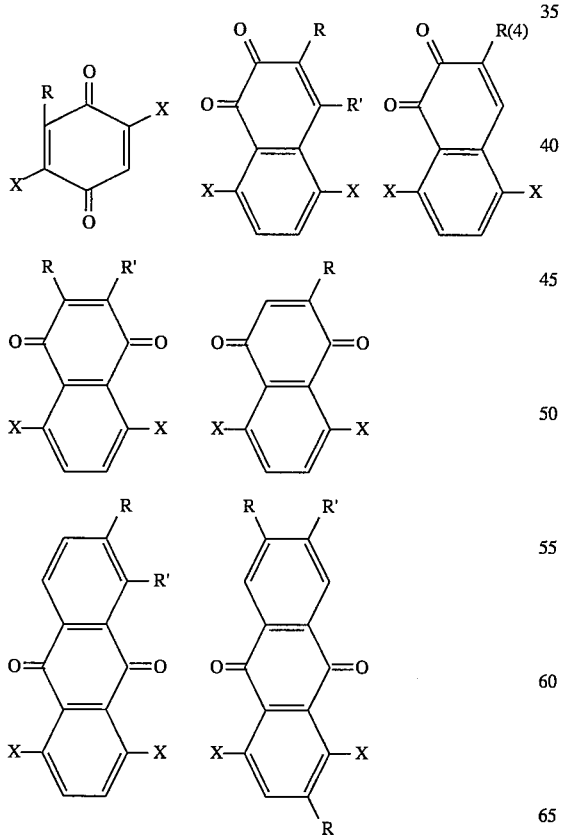

(wherein R represents an alkyl group and X represents a halogen atom). Then, the alkyl group-substituted dihalogenated aromatic compounds are reacted with a zero-valent nickel compound to attain the aimed alkyl group-substituted poly(quinone)s.

The poly(quinone) according to the present invention may preferably have a π-conjugated system extending along the principal chain. When it does not contain such a π-conjugated system, the polymer cannot polymer according to the present invention, there is no limitation on the number of carbon atoms, and its examples may include methyl group, ethyl group, propyl group, butyl group, pentyl group, hexyl group, octyl group and the like. However, it may be preferable for the alkyl substitution group of the dihalogenated aromatic compounds of quinones to have 1–4 carbon atoms. Once alkyl groups such as methyl groups are introduced into a poly(quinone), even in a case where only one alkyl group is introduced, the large intermolecular force of the poly(quinone) is weakened by a steric hindrance of the alkyl group, thereby significantly increasing the solubility of the polymer. Accordingly, an alkyl group-substituted poly(quinone) wherein the alkyl substitution group has only one carbon atom can attain the aim of the present invention. The more carbon atoms the substituting alkyl group includes, the more improved solubility the resulting polymer has. However, in the light of easiness of the industrial synthesis, it is preferable to introduce an alkyl group having 1–4 carbon atoms.

Since the poly(quinone) of the invention contains an alkyl substitution group, the polymer has a sufficiently large molecular weight of 20,000 or more.

Incidentally, the position at which one alkyl group-substituted quinone is combined to another, the position at which an alkyl substitution group is introduced, and the number of alkyl substitution groups to be introduced are not restricted as long as the resulting polymer could have a π-conjugated system extending along the principal chain. In the case where two or more alkyl groups are introduced into a repeating quinone unit as shown in Formula (2), they may be consisted of the same group (ex. plural methyl groups) or different groups (ex. methyl group and dodecyl group) as long as they all belong to the alkyl group.

The polymer according to the present invention has a polymerization degree (n) of not less than 20. When (n) is less than 20, the poly(quinone) may sometimes lack substantial functions as a polymer such as being sufficiently strong when formed into a film or the like. Preferably, the polymer of the invention may have a polymerization degree (n) of 100 or more. With such a high polymerization degree, the viscosity of solution, which is used when the polymer is formed into a film, is significantly increased, thereby making the resulting film quite strong. The inventors have prepared a poly(quinone) having a polymerization degree (n) of about 260 according to the invention through a method described below, and confirmed the excellent properties and the applicability of the polymer in experiments described below. As a matter of course, the preparation and the application of the polymer having the polymerization degree of more than 260 may be expected.

Examples of quinones applicable as a monomer in the present invention may include o-benzoquinone, p-benzoquinone, 1,2-naphthoquinone, 1,4-naphthoquinone, anthraquinone and the like. From the industrial point of view, anthraquinone is most preferable among them because it can be acquired at a low cost and easily synthesized into a dihalogenated alkyl derivative, which is used as a material for the polymer of the present invention.

According to the second aspect of the present invention, there is provided a method for producing an alkyl group-substituted poly(quinone) comprising dehalogenating dihalogenated aromatic compounds of alkyl group-substituted quinones by removing halogen atoms at two locations, and polymerizing the dehalogenated compounds in the presence of a nickel compound.

The dehalogenation of a dihalogenated aromatic compound may be conducted by reacting the dihalogenated aromatic compound with a substance selected from a group consisting of a metal capable of dehalogenating the dihalogenated aromatic compound and a compound containing such a metal in the presence of a nickel compound.

The alkyl group-substituted poly(quinone) according to the present invention may be obtained by reacting a dihalogenated alkylquinone as shown by Formula (4) with an equimolar amount or excess of a zero-valent nickel compound in an organic solvent for dehalogenation. A preferable reaction temperature range is 30°–100° C., and the reaction completes within about 10–100 hours. As the organic solvent, for example, N,N-dimethylformamide, acetonitrile, toluene, tetrahydrofuran or the like can be employed.

The zero-valent nickel compound withdraws halogens from halogenated aromatic compounds and causes a coupling reaction between the aromatic groups [an example can be seen in "Synthesis", p.736 (1984)]. This reaction is represented by the following Formula (5):

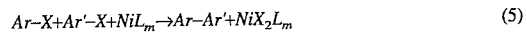

(wherein Ar and Ar' respectively represent an aromatic group, X represents a halogen atom, L represents a neutral ligand and hence NiL$_m$ represents a zero-valent nickel compound).

Accordingly, if an aromatic compound having two halogens in the molecule, such as dihalogenated alkyl-quinone, is reacted with an equimolar or excess of a zero-valent nickel compound, the polymer of the present invention can be obtained by the dehalogenation polycondensation reaction shown in the following Formulae (6) and (7):

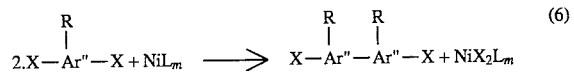

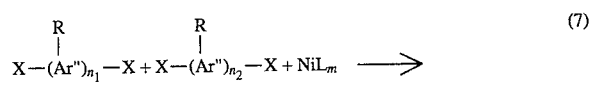

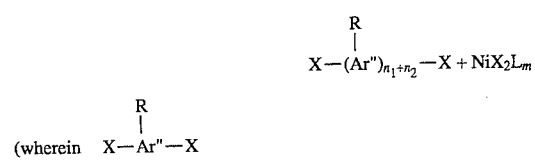

represents dihalogenated alkylquinone, R represents an alkyl group and X represents a halogen atom).

In the above-described reaction, zero-valent nickel compounds synthesized in a homogeneous reaction system immediately before the polymerization reaction can be used directly, so to speak, in situ. Alternatively, preliminarily synthesized and isolated ones can be used. Such a zero-valent nickel compound is, for example, a nickel complex produced by a reduction reaction or a ligand interchange reaction in the presence of a neutral ligand. As a typical example of the neutral ligand, mention may be made of nitrogen-containing ligands including 1,5-cyclooctadiene, 2,2'-bipyridine, tertiary phosphines including triphenylphosphine and the like.

The poly(quinone)s shown in the above Formula (2) can also be obtained by another process, wherein the dihalogenated alkylquinone shown in Formula (4) is dehalogenated through an electrochemical reduction reaction which is conducted in the presence of a transition metal compound such as divalent nickel compound. The polymer of the present invention may be obtained by still another process, wherein the dihalogenated alkylquinone is dehalogenated by a chemical reduction reaction with a reducing metal such as zinc conducted in the presence of a transition metal compound such as divalent nickel compound. For example, when a divalent nickel compound is electrochemically reduced in an electrolytic cell, a zero-valent nickel compound is produced by the reaction shown in the following Formula (8):

Accordingly, when an aromatic compound having two halogens in the molecule, for instance, a dihalogenated alkylquinone is electrochemically reduced in the presence of a nickel compound, the polymer shown in Formula (2) can be obtained according to the reaction shown in Formula (8)

and the consequent reactions shown in the following Formulae (9)–(11), wherein the Ni⁰Lm, which has been produced in the reaction system is involved.

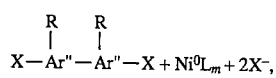

and

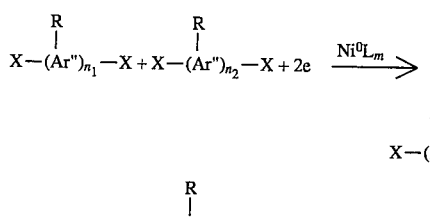

(wherein X—Ar″—X represents dihalogenated alkylquinone, R represents an alkyl group and X represents a halogen atom).

The electrolysis may generally be conducted under the following conditions: namely, polar solvent such as N,N-dimethylformamide and acetonitrile is used as the solvent, a salt such as tetraethylammonium perchlorate and tetraethylammonium tetrafluoroborate are dissolved as a supporting electrolytic salt to prepare an electrolyte, and platinum electrodes, ITO transparent electrodes or graphite electrodes are employed as the electrodes. There may be dissolved 1,4-dichloro-2-methylanthraquinone and divalent nickel complex in the electrolyte and electrochemical reduction is conducted at a reduction potential of the divalent nickel complex, for example, at −1.7V vs. Ag/Ag+ in the case of tris(2,2′-bipyridine) nickel salt.

A bivalent nickel compound can be reduced to a zero-valent one through the chemical reduction reaction with use of a reducing metal such as zinc as well as the electrochemical reduction reaction shown in the above Formula (8). In the case of the chemical reduction, the reducing metal performs the function of dehalogenating the dihalogenated alkylquinone to produce poly(alkylquinone) and the bivalent nickel compound functions as a catalyst.

As described above, a zero-valent nickel compound may preferably be used as a metal compound having dehalogenating power in the method for producing alkyl group-substituted poly(quinone) according to the present invention. Further, a ligand in such a zero-valent nickel compound is preferably a nitrogen-containing ligand such as 1,5-cyclooctadiene and 2,2′-bipyridine, or a tertiary phosphine such as triphenylphosphine.

Due to the excellent properties of the alkyl group-substituted poly(quinone) according to the present invention, the poly(quinone) can be formed into not only powders but also fibers and films by using an appropriate organic solvent. In addition, the polymer of the present invention can be reduced with use of a reducing agent or by chemical or electrochemical doping, and utilized as materials for batteries, materials for electrochromic devices, materials for electronic devices such as transistors or diodes, and conductive materials such as n-type conductors.

As described before, the alkyl group-substituted poly(quinone) according to the present invention is a π-conjugated polymer which undergoes a unique two-stepped electrochemical reduction at a rather small negative potential of about −1.0V vs. Ag/Ag+, more specifically at −1.3V vs. Ag/Ag+, while being accompanied by a color change. Further, since the polymer has an excellent solubility to common organic solvents, a solution thereof has a viscosity which is enough to form a sufficiently strong films thereof. Accordingly, the polymer can be suitably utilized as a material for electrochromic devices and a material for n-type semiconductor devices.

Therefore, according to the third aspect of the present invention, there is provided a material for electrochromic devices comprising an alkyl group-substituted poly(quinone) having a polymerization degree (n) of not less than 20, and comprising, as the repeating unit, bivalent residues of dihalogenated aromatic compounds of alkyl group-substituted quinones, which bivalent residues being obtained by removing halogen atoms at two locations.

Furthermore, according to the fourth aspect of the present invention, there is provided a material for n-type semiconductor devices comprising an alkyl group-substituted poly(quinone) having a polymerization degree (n) of not less than 20, and comprising, as the repeating unit, bivalent residues of dihalogenated aromatic compounds of alkyl group-substituted quinones, which bivalent residues being obtained by removing halogen atoms at two locations.

The present invention will be hereinafter explained in further detail by way of the following examples.

EXAMPLE 1

Synthesis of Poly(2-methylanthraquinone-1,4-diyl)

Under inert gas, 0.303 g of bis(1,5-cyclooctadiene) nickel complex (Ni(cod)2) (1.1 mmol) was added by 14 cm³ of N,N-dimethylformamide (DMF), 0.104 cm³ of 1,5-cyclooctadiene (cod) (0.85mmol) and 0.172 g of 2,2′-bipyridine (bpy) (1.1 mmol) in this order, and the mixture was stirred until the color thereof changed to purple. To this mixture was added, as the monomer of the aimed polymer, 14 cm³ of DMF solution of 1,4-dichloro-2-methylanthraquinone (1,4-Cl₂-MeAQ) (0.25 g, 1.1 mmol). After stirring at a temperature of 60° C. for 48 hours, the reaction solution was poured into diluent hydrochloric acid and there was produced an yellow powder. The thus-obtained precipitate powder was washed twice with diluent hydrochloric acid, once with methanol, three times with warm aqueous solution of sodium ethylenediaminetetraacetic acid (EDTA), once with warm water, and once again with methanol. It was then dissolved in chloroform to be precipitated again, and the obtained precipitate was vacuum-dried by heating, thereby obtaining a deep yellow powder. The yield of the polymer was 89%.

The analytical data of this polymer were C: 81.82%; H: 3.64%; Cl: 0%, and they almost agreed with the calculated values of C: 82.66%; H: 3.36%; Cl: 0.00%.

In the infrared absorption spectrum (KBr) of this polymer, there were observed absorption peaks at 3050 cm⁻¹ which is ascribed to the C—H stretching vibration, at 2950 cm⁻¹ which is ascribed to the C—H stretching vibration, at 1665 cm⁻¹ which is ascribed to the C=O stretching vibration, at 1590 and 1526 cm⁻¹ which are respectively ascribed to the C=C ring stretching vibration, at 1303 and 1247 cm⁻¹ which are respectively ascribed to the C—CO—C stretching and deformation vibration, and at 796–628 cm⁻¹ which is ascribed to the C—H out-of-plane deformation vibration.

In the ¹H-NMR spectrum of this polymer in CDCl₃ (90 MHz), there were observed peaks at δ=2.1, 2.3 and 2.6 ppm (which is assigned to 3H and CH$_3$) and at 7.5–8 ppm (which is assigned to 5H and others). The area ratio of these peaks was about 3:5. In the $^{13}$C-NMR spectrum of this polymer in CDCl$_3$ (67.9 MHz), there were observed peaks at $\delta$=21 ppm (which is assigned to CH$_3$), at $\delta$=126 ppm (which is assigned to C5 and C8), at 135 ppm (which is assigned to others), at $\delta$=145 ppm (which is assigned to C1, C2 and C4) and at $\delta$=180 ppm (which is assigned to C9 and C10).

The data obtained by the element analysis, infrared absorption spectrum, and NMR spectra support that the polymer has the following structure.

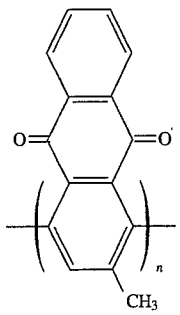

(12)

(wherein n represents a polymerization degree).

The polymer had a weight-average molecular weight of 57,000 (polymerization degree: 255) as determined by light scattering method in chloroform solution. The intrinsic viscosity of the polymer was measured as 0.43 dLg$^{-1}$. The ultraviolet-visible absorption spectrum of the polymer in chloroform solution had an absorption peak at 375 nm, which had been shifted toward a longer wavelength from that of the structure unit thereof, namely that of 2-methylanthraquinone at 329.8 nm. Moreover, the polymer showed a high thermal stability. As a result of thermogravimetric analysis under nitrogen, weight decrease was observed to start at about 300° C. and the weight loss at 900° C. was about 40%. The obtained polymer was soluble to chloroform, methylene chloride and N-methylpyrrolidone in an amount of 100 mg/10 ml or more, to toluene and benzene in an amount of about 80 mg/10 ml, and to tetrahydrofuran in an amount of about 50 mg/10 ml.

COMPARATIVE EXAMPLE 1

Synthesis of Poly(anthraquinone-1,4-diyl)

Under inert gas, 0.36 g of bis(1,5-cyclooctadiene) nickel complex (Ni(cod)$_2$) (1.3 mmol) was added by 14 cm$^3$ of N,N-dimethylformamide (DMF), 0.135 cm$^3$ of 1,5-cyclooctadiene (cod) (1.1 mmol) and 0.203 g of 2,2'-bipyridine (bpy) (1.3 mmol) in this order, and the mixture was stirred until the color thereof changed to purple. To this mixture was added, as the monomer of the aimed polymer, 14 cm$^3$ of DMF solution of 1,4-dichloroanthraquinone (1,4-Cl$_2$-AQ) (0.30 g, 1.1 mmol). After stirring at a temperature of 60° C. for 48 hours, the reaction solution was poured into diluent hydrochloric acid and there was produced an yellow powder. The thus-obtained precipitate powder was washed twice with diluent hydrochloric acid, once with toluene, three times with warm aqueous solution of sodium ethylenediaminetetraacetic acid (EDTA), once with warm water, and once again with toluene. It was then vacuum-dried by heating to obtain an yellow powder. The yield of the polymer was 80%. Incidentally, the portion which was soluble to chloroform was refined through precipitation with use of methanol.

The analytical data of this polymer were C: 81.55%; H: 2.91%; Ci: 0%, and they almost agreed with the calculated values of C: 80.36%; H: 3.81%; Ci: 0.00%.

In the infrared absorption spectrum (KBr) of this polymer, there were observed absorption peaks at 3050 cm$^{-1}$ which is ascribed to the C—H stretching vibration, at 1667 cm$^{-1}$ which is ascribed to the C=O stretching vibration, at 1590 cm$^{-1}$ which is ascribed to the C=C ring stretching vibration, at 1323 and 1247 cm$^{-1}$ which are respectively ascribed to the C—CO—C stretching and deformation vibration, and at 844–724 cm$^{31\ 1}$ which is ascribed to the C—H out-of-plane deformation vibration.

In the $^1$H-NMR spectrum of this polymer in CDCl$_3$ (90 MHz), there was observed a peak at $\delta$=7.5–8.5 ppm (m). In the solid-state $^{13}$C-NMR spectrum of this polymer (270 MHz), there were observed peaks at $\delta$=126 ppm (which is assigned to C5 and C8), at $\delta$=135 ppm (which is assigned to others), at $\delta$=145 ppm (which is assigned to C1 and C4) and at $\delta$=185 ppm (which is assigned to C9 and C10).

The data obtained by the element analysis, infrared absorption spectrum, and NMR spectra support that the polymer has the following structure.

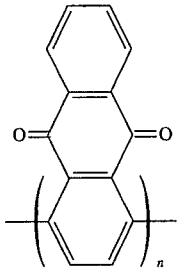

(13)

(wherein n represents a polymerization degree).

The ultraviolet-visible absorption spectrum of this polymer in chloroform solution had an absorption peak at 369 nm, which had been shifted toward a longer wavelength from that of the structure unit thereof, namely that of anthraquinone at 327 nm. Moreover, the polymer showed a high thermal stability. As a result of thermogravimetric analysis under nitrogen, weight decrease was observed to start at about 300° C. and the weight loss at 900° C. was about 40%. The obtained polymer showed such a poor solubility as about 5 mg per 10 ml to chloroform, methylene chloride and N-methylpyrrolidone. Due to this poor solubility, it was impossible for this polymer to be measured $^{13}$C-NMR spectrum in solution.

COMPARATIVE EXAMPLE 2

Synthesis of Poly(anthraquinone-1,5-diyl)

Under inert gas, 0.36 g of bis(1,5-cyclooctadiene) nickel complex (Ni(cod)$_2$) (1.3 mmol) was added by 14 cm$^3$ of N,N-dimethylformamide (DMF), 0.135 cm$^3$ of 1,5-cyclooctadiene (cod) (1.1 mmol) and 0.203 g of 2,2'-bipyridine (bpy) (1.3 mmol) in this order, and the mixture was stirred until the color thereof changed to purple. To this mixture was added, as the monomer of the aimed polymer, 14 cm$^3$ of DMF solution of 1,5-dichloroanthraquinone (1,5-Cl$_2$-AQ) (0.30 g, 1.1 mmol). After stirring at a temperature of 60° C. for 48 hours, the reaction solution was poured into diluent hydrochloric acid and there was produced an yellow powder. The thus-obtained precipitate powder was washed twice with diluent hydrochloric acid, once with toluene, three times with warm aqueous solution of sodium ethylenediaminetetraacetic acid (EDTA), once with warm water, and once again with toluene. It was then vacuum-dried by heating to obtain an yellow powder. The yield of the polymer was 90%.

In the infrared absorption spectrum (KBr) of this polymer, there were observed absorption peaks at 3050 cm$^{-1}$ which is ascribed to the C—H stretching vibration, at 1669 cm$^{-1}$ which is ascribed to the C=O stretching vibration, at 1578 cm$^{-1}$ which is ascribed to the C=C ring stretching vibration, at 1319 cm$^{-1}$ and 1266 cm$^{-1}$ which are respectively ascribed to the C—CO—C stretching and deformation vibration, and at 814–624 cm$^{-1}$ which is ascribed to the C—H out-of-plane deformation vibration.

In the solid-state $^{13}$C-NMR spectrum of this polymer (270 MHz), there were observed peaks at $\delta$=126 ppm (which is assigned to C4 and C8), at $\delta$=135 ppm (which is assigned to others), at $\delta$=145 ppm (which is assigned to C1 and C5) and at $\delta$=185 ppm (which is assigned to C9 and C10).

The data obtained by the infrared absorption spectrum and NMR spectrum support that the polymer has the following structure.

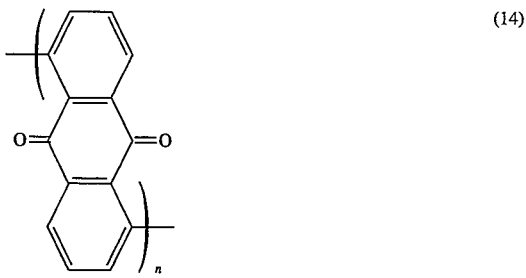

(14)

(wherein n represents a polymerization degree).

The thus-obtained poly(anthraquinone-1,5-diyl) was substantially insoluble to chloroform, methylene chloride, N-methylpyrrolidone, toluene, benzene and tetrahydrofuran.

COMPARATIVE EXAMPLE 3

Synthesis of Poly(1,4-naphthoquinone-5,8-diyl)

Under inert gas, 0.44 g of bis(1,5cyclooctadiene) nickel complex (Ni(cod)$_2$) (1.6 mmol) was added by 14 cm$^3$ of N,N-dimethylformamide (DMF), 0.144 cm$^3$ of 1,5-cyclooctadiene (cod) (1.3 mmol) and 0.248 g of 2,2'-bipyridine (bpy) (1.6 mmol) in this order, and the mixture was stirred until the color thereof changed to purple. To this mixture was added, as the monomer of the aimed polymer, 14 cm$^3$ of DMF solution of 5,8-dichloro-1,4-naphthoquinone (0.30 g, 1.3mmol). After stirring at a temperature of 60° C. for 48 hours, the reaction solution was poured into diluent hydrochloric acid and there was produced a brown powder. The thus-obtained precipitate powder was washed twice with diluent hydrochloric acid, once with toluene, three times with warm aqueous solution of sodium ethylene-diamine-tetraacetic acid (EDTA), once with warm water, and once again with toluene. It was then vacuum-dried by heating to obtain a deep brown powder. The yield of the polymer was 75%.

In the infrared absorption spectrum (KBr) of this polymer, there were observed absorption peaks at 3050 cm$^{-1}$ which is ascribed to the C—H stretching vibration, at 1657 cm$^{-1}$ which is ascribed to the C=O stretching vibration, at 1600–1540 cm$^{-1}$ which is ascribed to the C=C ring stretching vibration, at 1324 and 1245 cm$^{-1}$ which are respectively ascribed to the C—CO—C stretching and deformation vibration, and at 850 cm$^{-1}$ which is ascribed to the C—H out-of-plane deformation vibration.

In the $^1$H-NMR spectrum of this polymer in CD$_3$-SO-CD$_3$ (90 MHz), there were observed peaks at $\delta$=6.9 ppm (which is assigned to br, 2H, C2 and C3-H) and at $\delta$=7.6 ppm (which is assigned to br, 2H, C6 and C7-H), and the area ratio of these peaks was about 2:2. In the solid-state 13C-NMR spectrum of this polymer (270 MHz), there were observed peaks at $\delta$=136.5 ppm (which is assigned to others) and at $\delta$=185.5 ppm (which is assigned to C1 and C4).

The data obtained by infrared absorption spectrum and NMR spectra support that the polymer has the following structure.

(15)

(wherein n represents a polymerization degree).

The thus-obtained poly(1,4-naphthoquinone-5,8-diyl) showed a poor solubility of about 5 mg in 10 ml of N-methylpyrrolidone.

EXAMPLE 2

A chloroform solution of the poly(2-methylanthraquinone-1,4-diyl) obtained in Example 1 was applied onto a platinum plate and chloroform was removed to prepare a film of the polymer. With respect to this polymer film, cyclic voltammogram was measured in an anhydrous acetonitrile solution containing 0.1 mol$^{-1}$ of (C$_2$H$_5$)$_4$NClO$_4$ was at a scan rate of 20 mVS$^{-1}$ at room temperature. As a result, it was found in the polymer that a cation was doped (n-type doping) at about –1.38 and –1.69V vs. Ag/Ag+ in two-stepped manner, and dedoped in reverse scanning at about –1.38 and –1.69V vs. Ag/Ag+ in the same manner. In the case of doping, the color of the polymer film changed from yellow to red, and then to deep red in two-stepped manner. In the case of dedoping, a reverse discoloration was observed. The results are shown in Table 1. These doping and dedoping processes were repeated with no observable deformation of the film.

As described above, the polymer according to the present invention is capable of being electrochemically reduced, namely undergoing an electrochemical n-type doping, and the polymer exhibits electrochromic properties at the time of doping. Accordingly, the polymer of the present invention is electrochemically active and conductive, and therefore, usable as an electrode material for n-type semiconductor device and a material for electrochromic device.

On the other hand, similar phenomenon was observed in poly(anthraquinone-1,4-diyl) obtained in Comparative Example 1. In the cyclic voltammogram of the film of this polymer, two pairs of reduction-oxidation peaks were also observed at about –1.30V and –1.62V vs. Ag/Ag+, and the redox reactions were observed to be accompanied by color changes of the film between yellow and red, and between red and deep red, respectively. However, the film of poly(anthraquinone-1,4-diyl) formed on a platinum plate was quite brittle when compared with that of the polymer of the present invention due to the poor solubility. Further, repeatability of doping and dedoping was not good in this polymer.

The novel alkyl group-substituted poly(quinone) according to the present invention is soluble in many organic solvents because the alkyl substitution group has been introduced thereinto, and thus, their application has been significantly broadened. For example, the polymer can be easily formed into fibers and films by dry molding with use of an appropriate solvent. In addition, since the polymer undergoes two-stepped electrochemical reduction by the application of rather small voltage while being accompanied by color changes, it can be suitably used as materials for electrochromic devices, n-type conductor photoluminescence devices and electroluminescence devices.

Furthermore, according to the method of the present invention, wherein dehalogenation polycondensation of dihalogenated aromatic compounds of alkyl group-substituted quinone is conducted by making use of the reactive function of a nickel compound, an alkyl group-substituted poly(quinone) can be easily obtained while controlling the positions at which quinone units are combined together.

I claim:

1. An alkyl group-substituted poly(quinone) which includes a repeating unit, which has a polymerization degree (n) of not less than 20, and which includes a π-conjugated system, comprising, as the repeating unit, bivalent residues of dihalogenated aromatic compounds of alkyl group-substituted quinones in which the alkyl group has from 1–8 carbon atoms and the bivalent residues are obtained by removing halogen atoms at two locations.

2. The alkyl group-substituted poly(quinone) according to claim 1, wherein the alkyl group-substituted poly/quinone) has a principle chain, and wherein the π-conjugated system extends along the principal chain.

3. The alkyl group-substituted poly(quinone) according to claim 1, further having an improved solubility of not less than 50 mg per 10 ml of N-methylpyrrolidone.

4. The alkyl group-substituted poly(quinone) according to claim 1, wherein the alkyl group has 1–4 carbon atoms.

5. The alkyl group-substituted poly(quinone) according to claim 1, wherein the alkyl group-substituted quinones are anthraquinones.

6. The alkyl group-substituted poly(quinone) according to claim 1, wherein the polymerization degree (n) is not less than 100.

7. A method for producing an alkyl group-substituted poly(quinone) which includes a repeating unit, which has a polymerization degree (n) of not less than 20, and which includes a π-conjugated system, comprising:

dehalogenating and polycondensing to polymerize a dihalogenated aromatic compound of an alkyl group-substituted quinone by removing halogen atoms at two locations in the presence of a zero-valent nickel compound, whereby the zero-valent nickel compound withdraws halogens from the dihalogenated aromatic compound and causes coupling between aromatic groups thereof.

8. A method for producing an alkyl group-substituted poly(quinone) which includes a repeating unit, which has a polymerization degree (n) of not less than 20, and which includes a π-conjugated system, comprising:

dehalogenating and polymerizing a dihalogenated aromatic compound of an alkyl group-substituted quinone by removing halogen atoms at two locations in the presence of a divalent nickel compound through electrochemical reduction of the dihalogenated aromatic compound.

9. The method for producing an alkyl group-substituted poly(quinone) according to claim 7, wherein the zero-valent nickel compound includes a ligand selected from the group consisting of nitrogen-containing ligands and tertiary phosphines.

10. A material for an electrochromic device, comprising:

an alkyl group-substituted poly(quinone) which includes a repeating unit, which has a polymerization degree (n) of not less than 20, and which includes a π-conjugated system, comprising, as the repeating unit, bivalent residues of dihalogenated aromatic compounds of alkyl group-substituted quinones, the bivalent residues being obtained by removing halogen atoms at two locations, and the alkyl group having from 1–8 carbon atoms.

11. A material for an n-doped semiconductor device, comprising:

an alkyl group-substituted poly(quinone) which includes a repeating unit, which has a polymerization degree (n) of not less than 20, and which includes a π-conjugated system, comprising, as the repeating unit, bivalent residues of dihalogenated aromatic compounds of alkyl group-substituted quinones, the bivalent residues being obtained by removing halogen atoms at two locations, and the alkyl group having from 1–8 carbon atoms.

12. The material according to claim 10 wherein said alkyl group-substituted poly(quinone) has a π-conjugated system extending along the principal chain.

13. The material according claim 10, wherein said alkyl group-substituted poly(quinone) shows color changes at a negative potential of about −1V vs. Ag/Ag+, the color changes being caused by a two-stepped electrochemical reaction of the poly(quinone).

14. The method for producing an alkyl group-substituted poly(quinone) according to claim 7, wherein polymerizing the dehalogenated aromatic compounds in the presence of a zero-valent nickel compound is conducted at a temperature ranging from 30°–100° C.

15. The method for producing an alkyl group-substituted poly(quinone) according to claim 14, wherein polymerizing the dehalogenated aromatic compounds in the presence of a zero-valent nickel compound is conducted in an organic solvent.

16. The method for producing an alkyl group-substituted poly(quinone) according to claim 15, wherein polymerizing the dehalogenated aromatic compounds in the presence of a zero-valent nickel compound is conducted during a time period ranging from 10 to 100 hours.

17. The method for producing an alkyl group-substituted poly(quinone) according to claim 8, wherein electrochemical reduction is conducted by dissolving the dihalogenated aromatic compound and the divalent nickel compound in an electrolyte comprised of a polar solvent and a salt, and by applying a reduction potential across a pair of electrodes which is effective to electrochemically reduce the dihalogenated aromatic compound.

18. The method for producing an alkyl group-substituted poly(quinone) according to claim 9, wherein the nitrogen-containing ligand is selected from the group consisting of 1,5-cyclooctadiene and 2,2'-bipyridine, and wherein the tertiary phosphine is triphenylphosphine.

* * * * *